United States Patent Office 3,282,946

Patented Nov. 1, 1966

3,282,946
MANUFACTURE OF ORGANIC BASES

Ian Campbell and John Anthony Corran, Widnes, England, assignors to Imperial Chemical Industries Limited, London, England, a corporation of Great Britain

No Drawing. Filed July 2, 1964, Ser. No. 380,048
Claims priority, application Great Britain, July 19, 1963, 28,718/63
19 Claims. (Cl. 260—290)

This invention relates to a process for the manufacture of organic bases, and more particularly to a catalytic process for the manufacture of pyridine or substituted pyridines.

Processes have previously been disclosed whereby the interaction of ammonia and an ether of 2-hydroxy-3,4-dihydro-2H-pyran or an alkylated derivative thereof yields pyridine or an alkylated pyridine. In the previously known processes the reaction has been carried out in the vapour phase in the presence of a solid catalyst comprising activated alumina, with or without oxides of polyvalent metals such as chromium oxide and copper oxide, and with or without alkali metal sulphates such as sodium sulphate or potassium sulphate.

We have now found that the reaction may be carried out very conveniently and efficiently using a catalyst comprising a compound or compounds of boron and phosphorus.

Thus according to our invention we provide a process for the manufacture of pyridine or substituted pyridines which comprise interacting an ether of 2-hydroxy-3,4-dihydro-2H-pyran, or of a substituted derivative of 2-hydroxy-3,4-dihydro-2H-pyran, with ammonia in the vapour phase at an elevated temperature in the presence of a catalyst comprising a compound or compounds of boron and phosphorus.

The ethers of 2-hydroxy-3,4-dihydro-2H-pyran or substituted derivatives thereof suitable for use as starting materials include the ethers of alkylated derivatives, for example the ethers represented by the general formula:

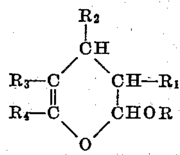

wherein each of $R_1$, $R_2$, $R_3$ and $R_4$ represents a hydrogen atom or an alkyl radical, and may be the same or different, and wherein R represents an etherifying group.

When any of groups $R_1$, $R_2$, $R_3$ and $R_4$ represents an alkyl radical, it is preferred that this should be a methyl or ethyl radical.

The etherifying group R may be an alkyl radical or an aliphatic hydrocarbon chain interrupted by one or more oxygen atoms, as for example, an alkoxyalkyl radical or a radical derived from an ether of a polyalkylene glycol.

It is preferred to use as starting materials those ethers which have adequate volatility to allow the vapour phase reaction to be carried out conveniently and to provide an adequate concentration of the ether in the reaction mixture. Thus it is preferred that the group R should contain not more than four carbon atoms, although it may contain more if desired. It is also preferred that the molecule of the ether should contain not more than eleven carbon atoms, although it may contain more if desired.

The ethers may be made, for example, by interacting a vinyl alkyl ether with an $\alpha,\beta$-unsaturated aldehyde, for example acrolein. The vinyl alkyl ether may be made, for example, from acetylene and a hydroxy compound, ROH.

The compound may if desired be deposited upon a support material or mixed with inert solids. Suitable support materials are for example those consisting essentially of silica, alumina or a mixture or combination thereof. We prefer to use the catalyst in a supported form and in a fluidised bed; an especially suitable support material is a microspheroidal silica-alumina with physical characteristics appropriate to fluidise bed operation.

Impregnation is most conveniently carried out by means of an aqueous solution containing boric acid and phosphoric acid. After impregnation with boric acid and phosphoric acid the catalyst is dried and calcined before use.

Suitable proportions of boron and phosphorus are for example those equivalent to between 0.3 and 3 gram atoms of boron for each gram atom of phosphorus but we prefer to use between 0.5 and 1.5 gram atoms of boron for each gram atom of phosphorus.

Suitable levels of the impregnants are for example those equivalent to between 2 and 20 parts by weight of phosphoric acid per 100 parts by weight of support material.

The relative proportions of ammonia and the ether, of the 2-hydroxy-3,4-dihydro-2H-pyran may suitably be between 1 and 20 moles of ammonia for each mole of the ether, preferably between 4 and 10 moles of ammonia for each mole of the ether. There may also be present diluent gases or vapours; these may be either inorganic, for example nitrogen, hydrogen and steam, or organic, for example benzene and methanol. We prefer to use steam as diluent, in the proportion of between 5 and 25 moles of steam per mole of the ether. Conveniently, ammonia may be fed into a gas stream containing the vapourised ether and the mixture passed into the catalyst bed.

Suitable temperatures at which the bed of catalyst may be maintained during reaction are those in the range from 200° C. to 500° C. preferably between 250° C. and 350° C. It is usually convenient to operate the process at substantially atmospheric pressure, any excess pressure above atmospheric being for the purpose of promoting flow of gas through the reactor and ancillary apparatus. Higher or lower pressures may be used if desired however.

The rate of flow of the said gas mixture is usually such as to give a contact time between 1 and 10 seconds with the catalyst.

Pyridine or substituted pyridines may be isolated from the gases emerging from the catalyst bed by conventional means, for example by condensation, scrubbing with water or acid, treatment with caustic alkali, extraction with non-aqueous solvents, fractional distillation, or combination of such techniques. Unreacted ammonia and unreacted starting material remaining after extraction of the desired products may, if desired, be recycled to the gas mixture fed into the catalyst zone. The alcohol ROH arising from the ether side-chain may be recovered and, if desired, re-used.

Pyridine or substituted pyridines isolated from the product may be converted into valuable pyridine derivatives, for example bipyridyls which are useful as intermediates for chemical synthesis and for the manufacture of herbicidal materials.

The process produces a high yield of pyridine bases, and has the additional advantage of producing relatively little "coke" or carbonaceous waste in the reaction zone. The activity and selectivity of the catalyst are maintained during prolonged periods of continous operation. Carbonaceous waste may be removed, and the catalyst restored to its original level of activity, by heating in a stream of air at 400–500° C.

The invention is illustrated but not limited by the following examples. Yields are calculated on a molar basis.

*Example 1*

The support material used was a microspheroidal silica-alumina, available commercially under the trade-name "Synclyst MS/HS," containing 13.0% $Al_2O_3$ and 86.8% $SiO_2$. 10 parts of boric acid and 21.5 parts of 88% phosphoric acid were added with stirring to 240 parts of distilled water and stirring was continued until the boric acid had dissolved. The solution was added with stirring to 200 parts of the silica-alumina support and the mixture was dried at 110° C. for 16 hours, followed by calcination at 350° C. for 4 hours. The catalyst was sieved to 80–200 B.S.S. mesh before use.

Vapourised 2-ethoxy-3,4-dihydro-2H-pyran was mixed continuously with ammonia and steam to give a mixture consisting of 5 moles of ammonia and 20 moles of steam for each mole of the pyran. The mixture was passed through a fluidised bed of 103 grams of the catalyst prepared as described above, contained in a glass tube 3 cm. in diameter. The temperature of the catalyst bed was maintained at 300° C. The flow-rate of the gas mixture was such that the contact time was 7.5 seconds and the depth of the catalyst bed, when fluidised, was 45 cm. The actual flow-rate of the pyran was 0.12 mole per hour. The flow was continued for 16 hours, the products were analysed and the conversion of the pyran into pyridine was measured for each of the four successive 4-hour periods. In the first of these periods the conversion was 37%, in the second 44%, in the third 50%, and in the fourth 47%.

*Example 2*

Vapourised 2-ethoxy-3,4-dihydro-2H-pyran was mixed continuously with ammonia, steam, and hydrogen to give a mixture consisting of 5 moles of ammonia, 10 moles of steam and 5 moles of hydrogen for each mole of the pyran. The mixture was passed through a fluidised bed of 103 grams of the catalyst prepared as described in Example 1, the temperature of the catalyst bed being maintained at 300° C. The flow-rate of the gas mixture was such that the contact time was 7.5 seconds. The actual flow-rate of the pyran was 0.15 mole per hour.

The flow was continued for 16 hours, the products were analysed and the conversion of the pyran into pyridine was measured for each of the four successive 4-hour periods. In the first of these periods the conversion was 35%, in the second 28%, in the third 48%, and in the fourth 52%.

What we claim is:

1. A process for the manufacture of pyridine or lower alkyl pyridines which comprises interacting an ether of 2-hydroxy-3,4-dihydro-2H-pyran or of a lower alkyl derivative of 2-hydroxy-3,4-dihydro-2H-pyran with ammonia in the vapor phase at a temperature in the range 200° C. to 500° C. in the presence of a catalyst comprising a compound or compounds of boron and phosphorus.

2. A process as claimed in claim 1 wherein the catalyst comprises a compound or compounds of boron, phosphorus and oxygen and contains between 0.3 and 3 gram atoms of boron for each gram atom of phosphorus.

3. A process as claimed in claim 2 wherein the catalyst contains between 0.5 and 1.5 gram atoms or boron for each gram atom of phosphorus.

4. A process as claimed in claim 1 wherein the catalyst is deposited upon a support material.

5. A process as claimed in claim 4 wherein the support material comprises silica, alumina or a mixture or combination thereof.

6. A process as claimed in claim 4 wherein the phosphorus content of the catalyst is equivalent to between 2 and 20 parts by weight of phosphoric acid per 100 parts by weight of the support material.

7. A process as claimed in claim 4 wherein impregnation of the support material is carried out by means of an aqueous solution containing boric acid and phosphoric acid.

8. A process as claimed in claim 1 wherein the ether of the 2-hydroxy-3,4-dihydro-2H-pyran carries an alkyl substituent at one or more of the 3,4,5 and 6-positions of the pyran ring.

9. A process as claimed in claim 8 wherein the alkyl substituent in any of the 3,4,5 and 6-positions is methyl or ethyl.

10. A process as claimed in claim 1 wherein the ether is an alkyl or an alkoxyalkyl ether.

11. A process as claimed in claim 10 wherein the etherifying alkyl or alkoxyalkyl group contains not more than 4 carbon atoms.

12. A process as claimed in claim 1 wherein the molecule of the ether contains not more than 11 carbon atoms.

13. A process as claimed in claim 1 wherein the reaction mixture contains between 1 and 20 moles of ammonia per mole of the ether.

14. A process as claimed in claim 13 wherein the reaction mixture contains between 4 and 10 moles of ammonia per mole of the ether.

15. A process as claimed in claim 1 wherein the reaction mixture contains a gaseous diluent.

16. A process as claimed in claim 15 wherein the gaseous diluent is steam.

17. A process as claimed in claim 16 wherein the reaction mixture contains between 5 and 25 moles of steam per mole of the ether.

18. A process as claimed in claim 1 wherein the reaction is carried out at a temperature in the range 200° C. to 500° C.

19. A process as claimed in claim 18 wherein the reaction is carried out at a temperature in the range 250° C. to 350° C.

No references cited.

WALTER A. MODANCE, *Primary Examiner.*

ALAN L. ROTMAN, *Assistant Examiner.*